USOO5185708A

United States Patent [19]
Hall et al.

[11] Patent Number: 5,185,708
[45] Date of Patent: Feb. 9, 1993

[54] METHOD FOR COLLECTING DATA BY A MANUFACTURING PROCESS MANAGER FROM A PLURALITY OF PROGRAMMABLE LOGIC CONTROLLERS

[75] Inventors: James F. Hall, Franklin; John H. Faett, III, Nolensville, both of Tenn.

[73] Assignee: GE Fanuc Automation North America, Inc., Charlottesville, Va.

[21] Appl. No.: 539,858

[22] Filed: Jun. 18, 1990

[51] Int. Cl.⁵ .............................................. G06F 15/46
[52] U.S. Cl. .............................. 364/550; 340/825.06; 364/136
[58] Field of Search .............. 364/550, 551.01, 551.02, 364/131, 132, 136, 184, 185; 340/825.06, 825.1

[56] References Cited

U.S. PATENT DOCUMENTS

| | | | |
|---|---|---|---|
| 4,234,926 | 11/1980 | Wallace et al. | 364/551 |
| 4,413,319 | 11/1983 | Schultz et al. | 364/131 X |
| 4,567,560 | 1/1986 | Polis et al. | 364/132 X |
| 4,672,530 | 6/1987 | Schuss | 364/131 X |
| 4,707,778 | 11/1987 | Yamada et al. | 364/132 |
| 4,803,613 | 2/1989 | Kametani et al. | 364/132 |
| 4,837,704 | 6/1989 | Lengefeld | 364/132 X |
| 4,858,101 | 8/1989 | Stewart et al. | 364/131 |
| 5,014,218 | 5/1991 | Crain et al. | 364/131 X |
| 5,068,778 | 11/1991 | Kosem et al. | 364/131 X |
| 5,072,374 | 12/1991 | Sexton et al. | 364/132 X |

OTHER PUBLICATIONS

"SALS 330-A Fast Responding System for Handling Process Interrupts for The Siemens 330 Process Computers", Siemens Power Engineering (1979), pp. 51-55.

*Primary Examiner*—Kevin J. Teska
*Attorney, Agent, or Firm*—James H. Beusse

[57] ABSTRACT

A data collection method is provided for use on a computer system including a host processor which is coupled to a plurality of programmable logic controllers (PLCs) via a communications bus. Each PLC is coupled to a respective controlled machine to gather Boolean alarm point information from several alarm points associated with that machine. The alarm point information from all the controlled machines is stored in a random access memories (RAM) in a respective PLC. The alarm points are grouped in memory such that a predetermined number of alarm points are stored in a trigger point register in the RAM. The host scans the trigger point registers of all the PLCs to determine if the value of any trigger point has changed since the last time such trigger point was scanned. If such a change of value in a particular trigger point is found, then the host requests that the value of each alarm point within that particular trigger point be transmitted to the host. An appropriate alarm is then annunciated to the user. However, if the host finds no change in the value of a particular trigger point from the value of that trigger point during a prior scan, then the host does not request the values of the individual alarm points associated with that trigger point.

7 Claims, 2 Drawing Sheets

METHOD FOR COLLECTING DATA BY A MANUFACTURING PROCESS MANAGER FROM A PLURALITY OF PROGRAMMABLE LOGIC CONTROLLERS

BACKGROUND OF THE INVENTION

This invention relates to programmable logic controllers (PLCs) and manufacturing process managers (MPMs) and, more particularly, to a data collection method for an MPM coupled to monitor a plurality of data points in each of a plurality of PLCs.

Programmable logic controllers (PLCs) are a relatively recent development in process control technology. As a part of process control, a programmable logic controller is used to monitor input signals from a variety of input points (input sensors) which report events and conditions occurring in a controlled process. For example, a PLC can monitor such input conditions as motor speed, temperature, pressure, volumetric flow, and the like. A control program is stored in a memory within the PLC to instruct the PLC what actions to take upon encountering particular input signals or conditions. In response to these input signals provided by input sensors, the PLC derives and generates output signals which are transmitted via PLC output points to various output devices to control a process. For example, the PLC may issue output signals to speed up or slow down a conveyer, rotate the arm of a robot, open or close a relay, raise or lower temperature as well as many other possible control functions too numerous to list.

Manufacturing process managers (MPMs) are dedicated host processors or computers used in manufacturing process control. In an exemplary distributed factory control system, PLCs are coupled to manage specific machines. Various machines may be grouped to form work cells with each machine in a cell being under the control of a separate corresponding PLC. (While one PLC could control multiple machines, in factories using assembly line techniques, it is desirable for maintenance purposes to have a one-to-one relationship between PLCs and machines.) Each work cell is assigned to a corresponding MPM which is responsible for monitoring, controlling, and coordinating the manufacturing devices and resources within a work cell and integrating the work cell with the rest of the factory. Thus, each MPM monitors a plurality of PLCs.

In the past, it has proven to be difficult for MPMs to collect data from a very large number of input points in a very short amount of time. However, on a shop floor where automated manufacturing is being conducted, exactly this situation is encountered. To illustrate the problem, an example is postulated wherein a manufacturing work cell includes 3500 points spread over a plurality of PLCs for which data collection is desired. One straightforward method of data collection is for the MPMs associated with the work cell to scan or poll all 3500 points all of the time. More specifically, each time the MPM scans a point, the current value of the point stored in a PLC is compared with the old value for that point. If a change between the present value and the old value is detected, an alarm message is generated and is appropriately annunciated to the user by the MPM system.

The above described approach is perfectly satisfactory as long as time is not of the essence. However, in actual practice, the time between the occurrence of the condition causing the alarm and the actual annunciation of the alarm may be unsatisfactorily long. Moreover, the number of messages which must be transmitted to request the input point information is very high in the above approach. More specifically, in a system where the maximum number of input points which can be requested by a particular message is 30, for example, it would require 117 messages to scan all 3500 input points. The transmission of such a high number of messages and the collection of data by the scanning method described above requires an unsatisfactorily large amount of time when time is of the essence.

SUMMARY OF THE INVENTION

Accordingly, one object of the present invention is to provide a time efficient method for the collection of data by an MPM from a plurality of PLCs.

Another object of the present invention is to provide a method for the collection of data by an MPM from a plurality of PLCs wherein the time between the occurrence of an alarm condition and the annunciation of the actual alarm is substantially minimized.

Yet another object of the present invention is to reduce the number of messages which must be transmitted to request input point information.

In accordance with the present invention, a method is provided for collecting data at an MPM in a system in which the MPM is a computer system which includes a series of distributed processors each coupled to a plurality of programmable logic controllers, the controllers being coupled to respective controlled devices, each controlled device including a plurality of Boolean alarm points and set conditions. The method includes the step of reading the controller Boolean alarm points, each alarm point providing an alarm bit of alarm information. The method further includes the step of reading the alarm bits as trigger groups within the MPM, each trigger group including a predetermined number of alarm bits and being stored in a respective trigger register within the controller. The method still further includes the step of repeatedly scanning, by the associated distributed processor or MPM, the trigger registers to determine if, from a first scan to a second scan, the value of any trigger register has changed. The method also includes the step of accessing, by the MPM, all alarm bits stored in any trigger register for which a change was found in the repeatedly scanning step, the MPM otherwise not requesting alarm bit information.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings in which:

DETAILED DESCRIPTION OF THE INVENTION

Figure 1:
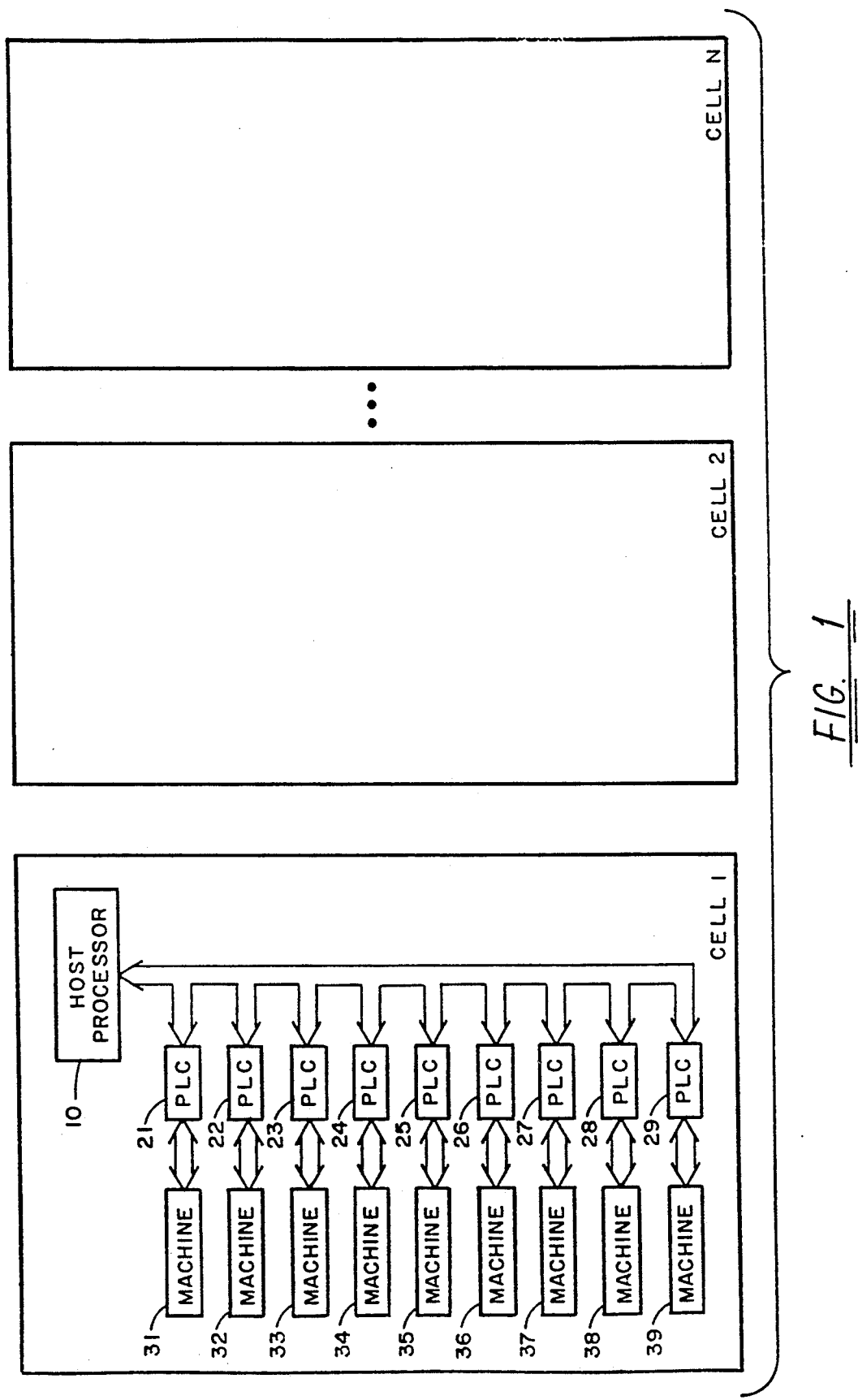
FIG. 1 is a block diagram representation of a computer system employing the data collection method of the present invention.

FIG. 1 shows a block diagram representation of a distributed processing arrangement for a factory in which the data collection method of the present invention may be practiced. The system of FIG. 1 includes a plurality of work cells 1, 2, 3, ... N, wherein N is an integer representing the total number of work cells in the system. Work cells 1, ...N are substantially similar in configuration and would typically be located on the shop floor of a manufacturing facility.

Work cell 1 includes a host processor or MPM 10 which in this particular embodiment of the invention is coupled to a plurality of PLCs 21, 22, 23, ... 29 via a common communications bus 30 coupled therebetween. One host processor which may be employed as host processor 10 is a VAX Model 3500 manufactured by the Digital Equipment Corporation although other host processors are suitable as well. One PLC which may be employed as PLCs 21, 22, 23 ... 29 is the GE Fanuc Series 6 PLC, although other PLCs may also be employed. This particular PLC includes a random access memory (RAM) which employs 16 bit registers for storage of data. A conventional standard MAP 3.0 (manufacturing automation protocol) communications network protocol is employed for communication between host processor 10 and the PLCs 21, 22, 23, .. 29 over bus 30.

Each of PLCs 21, 22, 23 ... 29 is coupled to a respective controlled machine 31, 32, 33 ... 39, wherein the controlled machine is typically a robot, conveyor, or any other device which is part of a controlled process and which includes Boolean information alarm points which require monitoring.

In work cell 1 of the system of FIG. 1, a plurality of information points or alarm points, for example, about 3500 Boolean alarm points, may be distributed across the nine PLCs of work cell 1. These alarm points are grouped into trigger points with each trigger point corresponding to 16 alarm points. Each trigger point is stored in a respective 16 bit trigger register within the associated PLC. More specifically, the trigger points are stored as contiguous sets of 16 bit registers in the random access memory (RAM) within PLCs 21-29. A memory map is formed in each of PLCs 21-29 which relates each bit of a 16 bit Series 6 register to a corresponding alarm point on a one-to-one correspondence basis.

In this particular embodiment of the invention, 219 trigger registers are located in the RAM's of PLCs 21-29. That is, the 219 trigger registers are distributed across PLCs 21-29 with some number of trigger registers being stored in the registers of each PLC. Those trigger registers associated with alarm points coupled to a particular PLC are stored in the respective RAM in that particular PLC.

Figure 2:
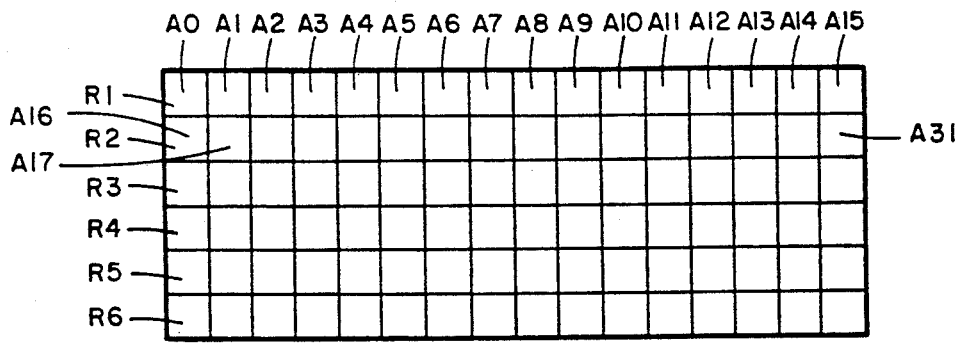
FIG. 2 is a representation of several trigger registers within the RAM memory of a PLC employing the data collection method of the present invention.

For example, FIG. 2 shows a representation of a portion of RAM in one of PLCs 21-29. The RAM of FIG. 2 includes a plurality of 16 bit trigger registers designated R1, R2, R3, ... . That is, the number of bits associated with these trigger registers is 16 in this particular example. Register R1 includes 16 storage locations each of which has a unique address, namely address A0, A1, ... A15. Register R2 includes storage locations A16, A17, ... A31. Register R3 includes storage locations A32, A33, and so forth. A different alarm point corresponds to each of the 16 bits or storage locations of each trigger register. The PLC, for example PLC 21, collects Boolean alarm point information from the alarm points of controlled machine or machines 31 coupled to such PLC. The information from each Boolean alarm point is stored in a respective one of the storage locations (bit cells) in the RAM of FIG. 2 in groups (trigger points) of 16, or any other predetermined multiple of 16 up to 64 for the illustrative example.

It is thus seen that the Boolean alarm points are grouped as contiguous sets of 16 bits within a Series 6 PLC register memory map. Each Boolean alarm point stored in such registers can be referenced as a PLC channeled output point. Each group of 16 bits, that is each trigger point, can be referenced as a PLC register. In actual practice, in the GE Fanuc Common Module Application Environment discussed later, an unsigned integer point is defined for each group of 16 Boolean alarm points to form the aforementioned trigger points. These integer points are the actual trigger points which are used in accordance with the invention to monitor all 3500 alarm points associated with work cell 1. In the same application environment, a unique Boolean alarm point is defined for each bit within a trigger point. In this manner, the 219 trigger points cover all 3500 alarm points in this particular cell.

In accordance with the invention, at a predetermined run time, host processor 10 scans all 219 trigger points and tests to determine if the value of any of these trigger points has changed from the last time that these trigger points were scanned. The trigger points are repeatedly scanned at regular intervals by host processor 10. If any of the Boolean alarm points change state, the value of the corresponding trigger register changes. Because the trigger register changed, the host processor 10 requests the alarm point values of each of the 16 alarm points associated with that trigger point. In other words, if the host processor finds that a trigger point value has changed, then the individual values of the 16 Boolean alarm points associated with the 16 bits of that trigger point (register) are requested by host 10. If host processor 10 finds that the trigger point value did not change from the last time that such trigger point value was requested and tested, then the individual Boolean alarm point values of all 16 alarm points in a particular trigger point are not requested by the host processor 10.

To actually request trigger point information from a PLC, host 10 transmits a MAP message over communications bus 30 requesting such information.

In a preferred embodiment, the method of the invention is practiced in conjunction with the GE Fanuc Common Module (CIMplicity) hardware/software package installed on the computer system depicted in FIG. 1. In accordance with the present invention, this package includes core software which is modified to handle alarm management in the manner described earlier. This core software is stored in host 10 and is adapted to collect alarm point information from PLCs 21-29 in the manner described above.

For sake of completeness, it is noted that several common software modules, such as a maintenance management module and a data logger report writer module, for example, are all linked to the core software of the package. These modules are referred to as common modules because they can share the alarm point information which is gathered when the data collection method of the invention is practiced.

Figure 3:
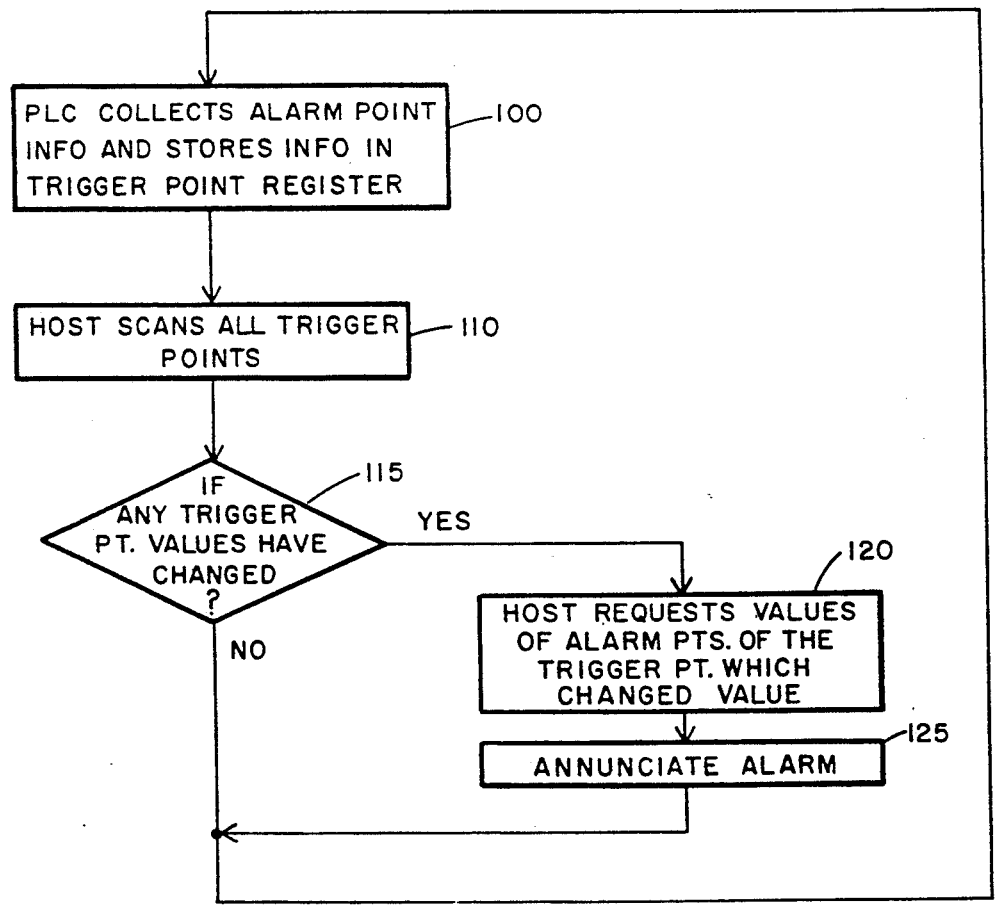
FIG. 3 is a flow diagram showing the steps of the data collection method of the present invention.

FIG. 3 is a flow diagram summarizing the data collection method of the present invention. First, as seen in block 100, the respective PLCs collect Boolean alarm point information from the controlled machines to which such PLCs are coupled and each PLC stores the alarm point information in a trigger point register, each location or bit of such trigger point register storing Boolean information from a different alarm point. The host then scans all trigger point registers after the alarm point information has been collected therein as per block 110. A test is then conducted as per decision block 115 by which the host compares the present value of each trigger register with the value of the same trigger register the last time that the host scanned that register. If the host finds that a trigger point value has changed from the last scan, then the host requests the value of the individual Boolean alarm points stored in that trigger point from the corresponding PLC as per block 120. The host then annunciates an alarm typically on a display device which the user can observe as per block 125.

Process flow then continues back to block 100 at which the PLCs continue to collect alarm point information, to block 105 at which such alarm point information is stored in the trigger points and then again to block 110 at which host 10 begins another scan of the trigger point information. It is noted that if a determination is made at decision block 115 that a particular value of a trigger point has not changed since the last scan of that trigger point by host 10, then the individual Boolean alarm point values for that trigger point are not requested by the host and flow continues back to block 100.

The foregoing has described a data collection method which permits the collection of data by an MPM from a plurality of PLCs in a time efficient manner. In the described method, the time between the occurrence of an alarm condition and the annunciation of the actual alarm is substantially minimized. Moreover, the number of messages which must be transmitted by the host to the PLC to request input point information is substantially reduced. In the particular example of the method described above, the number of MAP messages required to continuously monitor the 3500 Boolean alarm points is reduced from 117 to 8, i.e., 30 registers per MAP message. Moreover, the number of points which are scanned continuously by the host is reduced from 3500 to 219.

Those skilled in the art will appreciate that the data collection method of the present invention is not limited to the particular number of Boolean alarm points, trigger point register length, number of trigger points, and number of MAP messages discussed herein, but rather that these numbers are given only by way of example to help illustrate the invention.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A method for monitoring data comprising the steps of:
    providing a computer system having a host processor;
    coupling the host processor to a plurality of programmable logic controllers;
    coupling said controllers to respective controller devices;
    monitoring a plurality of alarm points with each controlled device;
    reading, by said controllers, Boolean alarm bits from said alarm points;
    providing an alarm bit of alarm information with each alarm point;
    storing said alarm bits as trigger groups within said controllers;
    including with each trigger group a predetermined number of alarm bits;
    storing the alarm bits in a respective trigger register within said controller;
    repeatedly scanning, by said host, the trigger registers;
    determining when scanning if, from a first scan to a second scan, the value of any trigger register has changed; and
    accessing, by said host processor, all alarm bits stored in any trigger register for which a change was determined when scanning, said host processor otherwise not requesting alarm bit information.

2. The methods as recited in claim 1 further comprising the step of providing an electromechanical device selected from the group consisting of a robot and a conveyor.

3. The method of claim 1 further including a step of annunciating an alarm when the host determines that the value of a particular trigger register has changed.

4. The method as recited in claim 3 wherein said annunciating step includes displaying the alarm on a display drive.

5. A method for monitoring data comprising the steps of;
    providing a computer system having a host processor;
    coupling the host processor to a plurality of programmable logic controllers;
    coupling said controllers to respective controlled devices;
    including with each controlled device a plurality of alarm points from which the host processor is to collect data;
    reading with said controllers Boolean alarm point information from said alarm points;
    providing an alarm bit of alarm information with each alarm point;
    grouping the alarm bits into trigger groups;
    exhibiting a predetermined bit length with each trigger group;
    storing said trigger groups in respective trigger registers in said controllers;
    scanning, by said host, the trigger registers to determine the values stored in said trigger registers;
    subsequently re-scanning, by said host, the trigger registers to determine if the value of any trigger register has changed from the prior scanning step; and
    accessing, by said host, all alarm bits stored in ay trigger register for which a change was found in said subsequently re-scanning step, said host otherwise not requesting alarm bit information.

6. The method of claim 5 further including a step of annunciating an alarm when the host determines that the value of a particular trigger register has changed.

7. The method as recited in claim 5 further comprising the step of providing electromechanical device selected from the group consisting of a robot and a conveyor.

* * * * *

UNITED STATES PATENT AND TRADEMARK OFFICE
CERTIFICATE OF CORRECTION

PATENT NO. : 5,185,708

DATED : 02/09/93

INVENTOR(S) : James F. Hall; John H. Faett, III

It is certified that error appears in the above-identified patent and that said Letters Patent is hereby corrected as shown below:

On the Title page, item [73], please add:

Saturn Corporation
Troy, Michigan 48007-7025

Signed and Sealed this

Twenty-ninth Day of March, 1994

Attest:

BRUCE LEHMAN

Attesting Officer

Commissioner of Patents and Trademarks